L. MEDZELA.
SELF SETTING MOUSETRAP.
APPLICATION FILED MAR. 2, 1920.
1,362,953.
Patented Dec. 21, 1920.
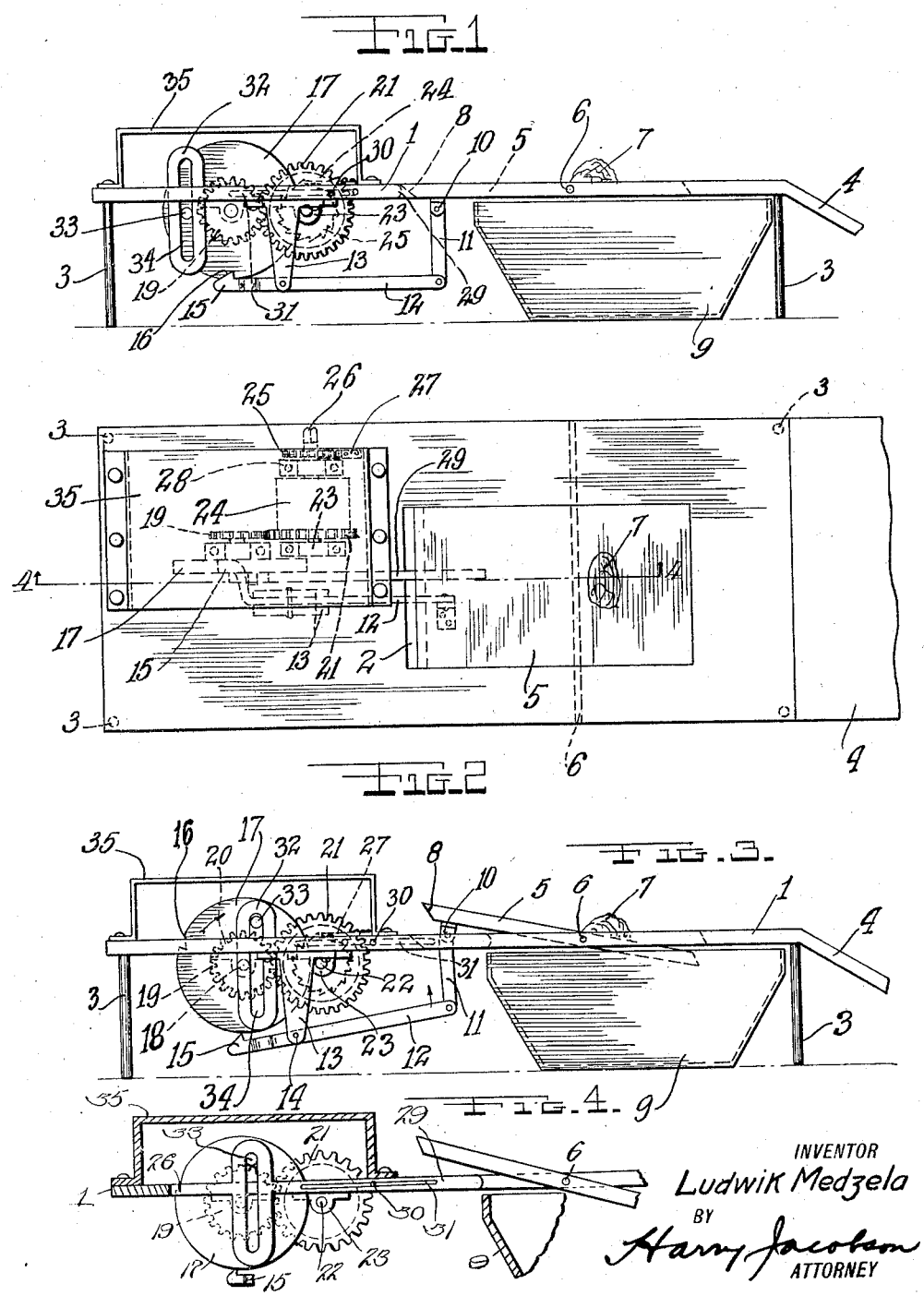

UNITED STATES PATENT OFFICE.

LUDWIK MEDZELA, OF BRADDOCK, PENNSYLVANIA.

SELF-SETTING MOUSETRAP.

1,362,953.

Specification of Letters Patent. Patented Dec. 21, 1920.

Application filed March 2, 1920. Serial No. 362,699.

*To all whom it may concern:*

Be it known that I, LUDWIK MEDZELA, citizen of Poland, and resident of Braddock, in the county of Allegheny and State of Pennsylvania, have invented certain new and useful Improvements in Self-Setting Mousetraps, of which the following is a specification.

This invention relates to self-setting mouse traps, and has for its object the provision of means designed to reset the trap automatically, so that an indefinite number of animals may be caught by the same trap in succession.

For the attainment of the aforesaid and other objects, I employ the device shown in its preferred form in the accompanying drawings, in which—

Figure 1 is a front view of my device as it appears when set for action.

Fig. 2 is a plan view of my invention, showing the trap partly open, Fig. 3 is a front view of the same and Fig. 4 is a vertical sectional view taken on line 4—4 of Fig. 2.

In the practical embodiment of my invention, the table 1 has a trap opening 2 therein, and is supported by suitable posts as 3, at such a distance from the floor that the mouse cannot reach said table without advancing along the runway 4. A trap door 5, pivoted on rod 6 at a point in advance of its center, is adapted to hold bait as 7 thereon, and is arranged to normally close opening 2, due to the weight of the larger rear portion. Said trap door 5 is beveled at the rear edge 8 thereof, to fit and rest upon a corresponding beveled edge in table 1. A receptacle 9 deep enough to prevent mice caught therein from escaping, is placed underneath trap 5.

A mouse attempting to get bait 7, must advance on to the forward part of trap 5. The weight of the mouse will overbalance the weight of the rear portion of trap 5, and will cause said trap to be suddenly turned about rod 6. The upper surface of trap 5 being smooth and slippery, the sudden rotation of said trap will precipitate the mouse into receptacle 9. At the same time, the rear end of trap 5, to the underside of which is attached angle 10, is lifted, carrying with it said angle, link 11 attached thereto, and one end of lever 12, to which said link is attached.

A hanger 13, fastened to the underside of table 1, supports lever 12 at 14, between the ends of said lever. A tooth 15, at the rear end of lever 12, is adapted to engage notch 16 in disk 17, said disk being mounted on shaft 18, supported by bearing 19 from the under side of table 1. Gear 20 on shaft 18, engages gear 21 on shaft 22, which is supported from the under side of table 1 by bearings 23 and 28. On the same shaft 22 is mounted an inclosed clock spring 24, shown diagrammatically in Fig. 2, and a ratchet wheel 25, the end of said shaft 22 being made square for turning said shaft by means of a key for winding up said spring 24.

Backward rotation of shaft 22 is prevented by stationary pawl 27 attached to table 1, and engaging ratchet wheel 25. A suitable opening is made in table 1, to allow said disk, gears, spring, and ratchet wheel, to project through said table as shown, a cover 35 being provided for protecting the mechanism. An arm 29 is arranged to move longitudinally in another opening in table 1, and is supported by pins 30 passing through slot 31 of said arm. A slotted guide 32 is attached substantially at right angles to the rear end of said arm 29, pin 33 on disk 17 being arranged to operate in the slot 34 of said guide.

Winding up spring 24, by turning shaft 22 in the same manner as a clock is wound up, and then setting tooth 15 into notch 16, sets the trap, the various parts assuming the positions shown in Fig. 1. When a mouse gets on the trap 5, thereby lowering the forward end thereof, the rear end is raised, releasing tooth 15 from notch 16, and allowing disk 17 to be turned by spring 24, through the various gears. It requires only a small movement of said disk to move guide 32, and arm 29 attached thereto forward, to assist in suddenly lifting the rear end of trap 5, which drops the mouse into receptacle 9. Disk 17 continues to rotate until notch 16 reaches tooth 17 again, when the weight of the rear end of the trap 5 acts to lower link 31, and that end of lever 12 connected thereto, causing said tooth to re-enter notch 16 to reset the trap ready for the next victim.

What I claim is:

1. In a self setting mouse trap, a table having an opening therein, a trap door rotatable through a small angle arranged for closing said opening in the trapping position, a receptacle underneath said opening, a lever operatively connected to one end of said door, a tooth projecting from one end of said lever, a revoluble disk having a notch therein for engaging said tooth for normally holding said door in trapping position, and spring actuated means for revolving said disk one revolution on the disengagement of said tooth from said notch for causing said tooth to reëngage said notch.

2. In a self setting mouse trap, a table having an opening therein, a trap rotatable through a small angle, arranged for closing said opening in the trapping position, a receptacle underneath said opening, a lever operatively connected to one end of said door, a tooth projecting from one end of said lever, a revoluble disk having a notch therein for engaging said tooth for normally holding said door in trapping position, a pin on said disk, a slotted guide operated by said pin on the rotation of said disk, an arm connected to said guide for assisting in the sudden rotation of said door when said tooth is disengaged from said notch, and a spring operatively connected to said disk for revolving said disk one revolution on the disengagement of said tooth from said notch for causing said tooth to reëngage said notch.

Signed at Braddock, in the county of Allegheny and State of Pennsylvania this 28th day of February, A. D. 1920.

LUDWIK MEDZELA.